United States Patent
Liu et al.

(10) Patent No.: US 10,909,344 B2
(45) Date of Patent: Feb. 2, 2021

(54) FINGERPRINT IDENTIFICATION CONTROL METHODS, TOUCH PANELS AND DISPLAY DEVICES

(71) Applicant: KunShan Go-Visionox Opto-Electronics Co., Ltd., Jiangsu (CN)

(72) Inventors: Mingxing Liu, Jiangsu (CN); Deqiang Zhang, Jiangsu (CN); Dongyun Lv, Jiangsu (CN); Xuliang Wang, Jiangsu (CN); Shuaiyan Gan, Jiangsu (CN); Feng Gao, Jiangsu (CN)

(73) Assignee: KUNSHAN GO-VISIONOX OPTOELECTRONICS CO., LTD., Jiangsu (CN)

( * ) Notice: Subject to any disclaimer, the term of this patent is extended or adjusted under 35 U.S.C. 154(b) by 0 days.

(21) Appl. No.: 16/434,366

(22) Filed: Jun. 7, 2019

(65) Prior Publication Data

US 2019/0286873 A1    Sep. 19, 2019

Related U.S. Application Data

(63) Continuation of application No. PCT/CN2018/096277, filed on Jul. 19, 2018.

(51) Int. Cl.
    *G06K 9/00*  (2006.01)
    *G06F 3/041*  (2006.01)
    (Continued)

(52) U.S. Cl.
    CPC ....... *G06K 9/00013* (2013.01); *G06F 1/1605* (2013.01); *G06F 3/0412* (2013.01);
    (Continued)

(58) Field of Classification Search
    CPC ............. G06K 9/0004; G06K 9/00006; G06K 9/00087; G06K 9/00013
    See application file for complete search history.

(56) References Cited

U.S. PATENT DOCUMENTS

| | | | |
|---|---|---|---|
| 2008/0095412 A1* | 4/2008 | Fujieda | A61B 5/02007 382/124 |
| 2009/0034804 A1 | 2/2009 | Cho et al. | |

(Continued)

FOREIGN PATENT DOCUMENTS

| | | |
|---|---|---|
| CN | 101290465 A | 10/2008 |
| CN | 105809003 A | 7/2016 |

(Continued)

OTHER PUBLICATIONS

ISR_for_International_Application_No. PCTCN2018096277.

(Continued)

*Primary Examiner* — Koosha Sharifi-Tafreshi
(74) *Attorney, Agent, or Firm* — Ladas & Parry LLP

(57) ABSTRACT

Fingerprint identification control methods, touch panels and display devices are provided. The touch panel includes a substrate, a touch film layer arranged on a side of the substrate, an image processing module arranged on a position corresponding to a preset region of the touch film layer, and the image processing module includes a first module and a second module performing fingerprint identification and image capturing in a time share manner.

12 Claims, 2 Drawing Sheets

(51) Int. Cl.
 H04N 5/232 (2006.01)
 G06K 9/20 (2006.01)
 H04N 5/225 (2006.01)
 G06F 1/16 (2006.01)

(52) U.S. Cl.
 CPC ......... *G06K 9/00087* (2013.01); *G06K 9/209* (2013.01); *H04N 5/2251* (2013.01); *H04N 5/232* (2013.01)

(56) References Cited

U.S. PATENT DOCUMENTS

| 2013/0135328 A1* | 5/2013 | Rappoport | G06F 3/0481 |
| | | | 345/522 |
| 2017/0123454 A1* | 5/2017 | Evans, V | G02F 1/1368 |
| 2017/0243043 A1* | 8/2017 | Andersson | G06K 9/001 |
| 2018/0341290 A1* | 11/2018 | Sim | G06F 1/1637 |

FOREIGN PATENT DOCUMENTS

| CN | 106293277 A | 1/2017 |
| CN | 106527792 A | 3/2017 |
| CN | 106790808 A | 5/2017 |
| CN | 106920470 A | 7/2017 |
| CN | 106991394 A | 7/2017 |
| CN | 106997252 A | 8/2017 |
| CN | 107203735 A | 9/2017 |
| CN | 107481669 A | 12/2017 |
| CN | 107491683 A | 12/2017 |
| CN | 108171178 A | 6/2018 |
| TW | I512636 B | 12/2015 |
| TW | I609337 B | 12/2017 |

OTHER PUBLICATIONS

CN108171178 A—Espacenet English Abstract.
CN106920470 A—Espacenet English Abstract.
CN105809003 A—Espacenet English Abstract.
CN107481669 A—Espacenet English Abstract.
CN101290465 A—Espacenet English Abstract.
TWI609337 B—Espacenet English Abstract.
TWI512636 B—Espacenet English Abstract.
CN107203735 A—Espacenet English Abstract.
CN106293277 A—Espacenet English Abstract.
CN 106991394 A_ Espacenet English Abstract.
CN 106790808 A_ Espacenet English Abstract.
CN 106997252 A_ Espacenet English Abstract.
CN 106527792 A_ Espacenet English Abstract.
CN 107491683 A_ Espacenet English Abstract.

* cited by examiner

FINGERPRINT IDENTIFICATION CONTROL METHODS, TOUCH PANELS AND DISPLAY DEVICES

CROSS-REFERENCE TO RELATED APPLICATION

This application is a continuation application of International Application No. PCT/CN2018/096277, filed on Jul. 19, 2018, which is based upon and claims priority to Chinese Patent Application No. 201711485074.9, filed Dec. 29, 2017, with a title "FINGERPRINT IDENTIFICATION CONTROL METHOD, TOUCH PANEL AND DISPLAY DEVICE", the entire contents of which are hereby incorporated by reference.

FIELD

Exemplary embodiments of the application relate to the display technologies, and in particular, to fingerprint identification control methods, touch panels and display devices.

BACKGROUND

In the prior art, integrating a fingerprint identification function into a display panel to enhance the user experience has already become a current technology trend.

Currently, in the display panel with the fingerprint identification function, a fingerprint identification module is generally arranged in a non-display region of the display panel, and is mostly arranged at a position corresponding to the exposed Home key. Fingerprint information of the user is collected when the user touches the Home key with his/her finger, and then a fingerprint identification is completed based on a comparison result.

However, the fingerprint identification module being arranged in the non-display region will inevitably limit a full screen design of the touch panel, which is disadvantageous to realize the full screen of the touch panel. Thus, considering the design of the front-camera, it will certainly occupy a part of the non-display region. Therefore, it is urgent to find a full screen solution that can realize fingerprint identification and front-shot function.

SUMMARY

Exemplary embodiments of the application provide fingerprint identification control methods, touch panels and display devices to solve the technical problem in the prior art of an limitation to achieve a full screen solution due to the existence of a fingerprint identification module and a front-camera.

To solve the above technical problem, exemplary embodiments of the application adopt the following technical solutions:

A touch panel comprising: a substrate, a touch film layer arranged on a side of the substrate, an image processing module arranged on a position corresponding to a preset region of the touch film layer, and the image processing module comprising a first module and a second module performing fingerprint identification and image capturing in a time share manner.

Optionally, the first module and the second module are integrated together, and are arranged at a side of the touch film layer adjacent to the substrate.

Optionally, the first module is an image collecting module collecting a fingerprint image in a fingerprint identification mode and a scene image in a shooting mode in a time share manner, and the second module is an image processing module processing the fingerprint image and the scene image in a time share manner.

Optionally, further comprising: a display film layer interposed between the substrate and the touch film layer.

Optionally, the first module is separated from the second module; and the first module is arranged between the display film layer and the touch film layer, and the second module is arranged at a side of the display film layer adjacent to the substrate.

Optionally, an orthographic projection of a position occupied by the first module on the substrate coincides with an orthographic projection of a position occupied by the second module on the substrate.

Optionally, the first module and the second module are integrated together, and are arranged at a side of the display film layer adjacent to the substrate.

Optionally, the first module is a fingerprint identification module collecting fingerprint information and performing comparison and identification of the fingerprint information in a fingerprint identification mode; and the second module is a shooting module capturing scene images and processing the scene images in a shooting mode.

Optionally, the first module comprises: image sensing elements arranged in an array and a fingerprint identification processor in the first module, or, an ultrasonic transmitter, a receiver, and a fingerprint identification processor located in the first module.

A display device comprising the above touch panel.

A method for performing fingerprint identification control using a display device, comprising: collecting, when detecting that a touch operation implemented in a position corresponding to a preset region of a touch film layer in the display device meets a preset condition, a first fingerprint information corresponding to the touch operation, wherein the preset region is provided with an image processing module for performing fingerprint identification and image shooting in a time share manner; and searching whether there is a second fingerprint information matching with the first fingerprint information in a pre-stored fingerprint information list, and if yes, determining that the fingerprint identification is successful.

Optionally, the collecting the first fingerprint information corresponding to the touch operation comprises: triggering an image processing module in the preset region to be turned on; and obtaining from the preset region where the touch operation is implemented the first fingerprint information.

Optionally, the collecting the first fingerprint information corresponding to the touch operation comprises: triggering an image processing module in the preset region to be turned on, and illuminating sub-pixels corresponding to the preset region to be lit up; and obtaining from the preset region where the touch operation is implemented the first fingerprint information.

Optionally, the display device comprises the image processing module, and the image processing module comprises a first module and a second module, when the first module and the second module are integrated together, the first module and the second module are triggered to be turned on, and an image information in a current shooting scene is collected by using the first module; or when the first module and the second module are separately arranged, only the second module used as a shooting module is triggered to be turned on, and the image information in the current shooting scene is collected using the second module.

Optionally, further comprising: triggering, when a shooting command is received, the image processing module in the preset region to be turned on, and collecting an image information in a current shooting scene; and triggering the illuminating sub-pixels of the display device corresponding to a region other than the preset region of the touch film layer to be lit up, and displaying image content corresponding to the image information collected by the image processing module.

Optionally, the preset condition comprises at least one of the following: a pressing time implemented with the touch operation is greater than a first threshold; and a pressing force implemented with the touch operation is greater than a second threshold.

Optionally, the collecting the first fingerprint information corresponding to the touch operation comprises: triggering the image processing module in the preset region to be turned on, and collecting from the preset region where the touch operation is performed the first fingerprint information using an ultrasonic fingerprint identification manner; or, triggering the image processing module in the preset region to be turned on, and meanwhile triggering illuminating sub-pixels corresponding to the preset region to be lit up, thereby providing a light source for an optical sensing element, so as to collect and obtain from the preset region where the touch operation is implemented the first fingerprint information using an optical fingerprint identification manner.

Optionally, the collected first fingerprint information comprises a fingerprint of at least one finger; correspondingly, the second fingerprint information also comprises a fingerprint of at least one finger.

Optionally, the second fingerprint information is a fingerprint information pre-stored in the pre-stored fingerprint information list, and the second fingerprint information pre-stored in the pre-stored fingerprint information list is collected and saved when a fingerprint is set.

The following advantageous effects may be achieved by at least one of the above technical solutions adopted by embodiments of the application:

In exemplary embodiments of the application, the image processing module arranged in the preset region of the touch film layer is compatible with the fingerprint identification function and the image capturing function. Since the image processing module is arranged under the touch film layer and can be arranged in the display region where the touch film layer is located, it does not need to occupy the non-display region in the front side of the touch panel, so that no additional frame is needed to accommodate fingerprint identification components and the camera components of the peripheral device, so that the full screen design of the touch panel can be effectively realized. Moreover, considering that the image processing module of the application has both fingerprint identification function and image capturing function, the defects of peripheral components occupying the display region can be reduced, and the effectiveness of the full screen design can be further improved. In addition, the fingerprint identification function and the image capturing function are integrated in the same region, which not only improves the compactness of the components, reduces the screen ratio, but also optimizes the manufacturing process.

BRIEF DESCRIPTION OF THE DRAWINGS

The drawings described herein are intended to provide a further understanding of the application, and are intended to be a part of the application. The illustrative embodiments of the application and the description thereof are intended for explaining the application and do not constitute an undue limitation to the application. In the drawing.

DETAILED DESCRIPTION

To make the objective, the technical solution and the advantages of the application dearer, the technical solutions of the application will be clearly and completely described in conjunction with the specific embodiments of the application and the accompanying drawings. It is apparent that the described embodiments are only a part of the embodiments of the application, and not all of them. Based on the embodiments in the application, all other embodiments obtained by a person skilled in the art without creative work fall within the protection scope of the application.

The technical solutions provided by exemplary embodiments of the application are described in detail below in conjunction with the accompanying drawings.

Figure 1:
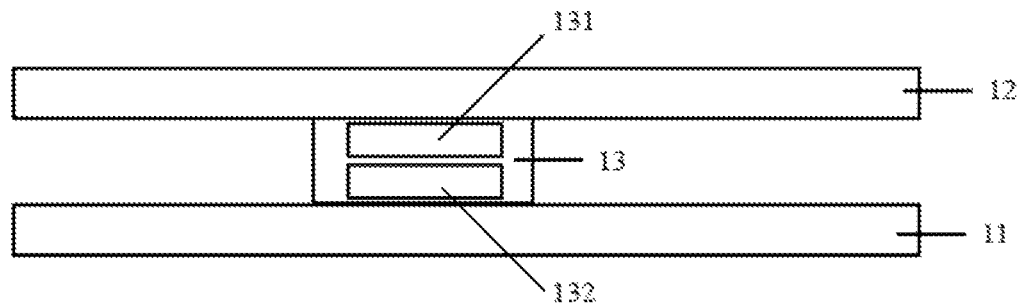
FIG. 1 is a schematic structural view of a touch panel according to an embodiment of the application.

Refer to FIG. 1, FIG. 1 is a schematic structural view of a touch panel according to an embodiment of the application. It should be noted that the application does not limit the type of the touch panel, and may be an OLED touch panel or a micro LED touch panel. In addition, it may also be an LCD touch panel. The following mainly describes an OLED touch panel as an example. The touch panel mainly includes:

a substrate 11, a touch film layer 12 arranged on a side of the substrate 11, an image processing module 13 arranged on a position corresponding to a preset region of the touch film layer 12, and the image processing module 13 includes a first module 131 and a second module 132 configured to perform fingerprint identification and image capturing in a time share manner.

The position corresponding to the preset region of the touch film layer may be located on the touch film layer, or an orthographic projection of the image processing module may be located in the preset region of the touch film layer. In the application, the image processing module is not limited to be arranged on the touch film layer, and may be arranged in other film layers. The application is mainly described by taking arrangement on the touch film layer for an example.

The substrate 11 involved in the application may be a rigid substrate or a flexible substrate. The pattern of the touch film layer 12 is not limited, and may be any pattern electrode capable of realizing a touch function. The preset region involved herein refers to a display region on the touch film layer where any image processing module of the touch panel may be arranged correspondingly. Preferably, it may be arranged at an edge region of the corresponding touch panel or a middle and lower portion of the display region of the corresponding the touch panel.

The image processing module can independently perform the fingerprint identification operation and the image capturing operation at different time periods; for example, in a first time period, the fingerprint identification operation can be implemented; and in a second time period that does not intersect with the first time period, an image shooting operation is implemented. Therefore, in the application, the image processing module arranged in the preset region of the touch film layer is compatible with the fingerprint identification function and the image capturing function. Since the image processing module is arranged under the touch film layer and can be arranged in the display region where the touch film layer is located, it does not need to occupy the non-display region in the front side of the touch panel, so that no additional frame is needed to accommodate fingerprint identification components and the camera components of the peripheral device, so that the full screen design of the touch panel can be effectively realized. Moreover, considering that the image processing module of the application has both fingerprint identification function and image capturing function, the defects of peripheral components occupying the display region can be reduced, and the effectiveness of the full screen design can be further improved. In addition, the fingerprint identification function and the image capturing function are integrated in the same region, which not only improves the compactness of the components, reduces the screen ratio, but also optimizes the manufacturing process.

Optionally, in the application, the image processing module may be an integrated design, that is, each module is integrated together; or an assembly design, that is, each module is separately designed. For details, refer to the following two touch panel structures.

Figure 2A:
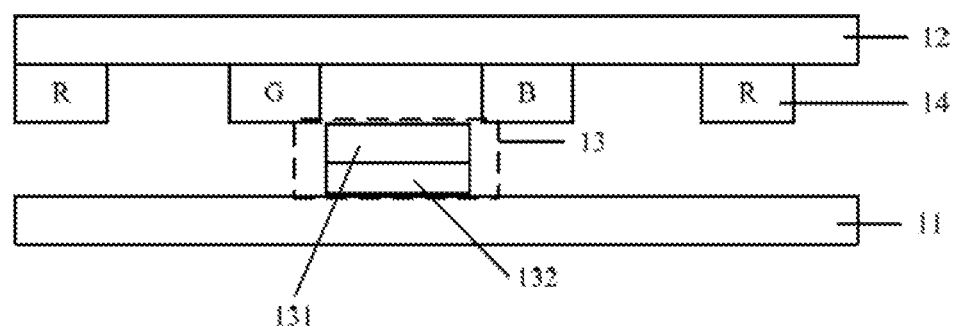
FIG. 2(a) is a schematic view of a first structure of a touch panel according to an embodiment of the application.

Structure 1:

Referring to FIG. 2(a), the touch panel further includes: a display film layer 14 interposed between the substrate 11 and the touch film layer 12; the first module 131 and the second module 132 are integrated together, and are arranged at a side of the display film layer 14 adjacent to the substrate 11.

Optionally, in the structure, the first module 131 is an image collecting module which collects a fingerprint image in a fingerprint identification mode and a scene image in a shooting mode in a time share manner, and the second module 132 is an image processing module which processes the fingerprint image and the scene image in a time share manner.

Specifically, in the fingerprint identification mode, the first module 131 collects a fingerprint image, and sends the fingerprint image to the second module 132 for comparison and identification. In the shooting mode, the first module 131 collects a scene image, and sends the scene image to the second module 132 for processing. The specific processing operation may include image beautification and display, and the like.

Then, in the structure 1, the specific hardware structure of the image processing module includes: image sensing elements arranged in an array, and a processor. Modules including various algorithms is integrated in the processor to realize identification, comparison, processing, and the like, of image information collected by the image sensing element.

The structure 1 integrates the fingerprint identification function and the image capturing function in one module in an integrated manner, thereby achieving compact arrangement of structural components, and meanwhile, simplifying the structure of the in-display components.

Figure 2B:
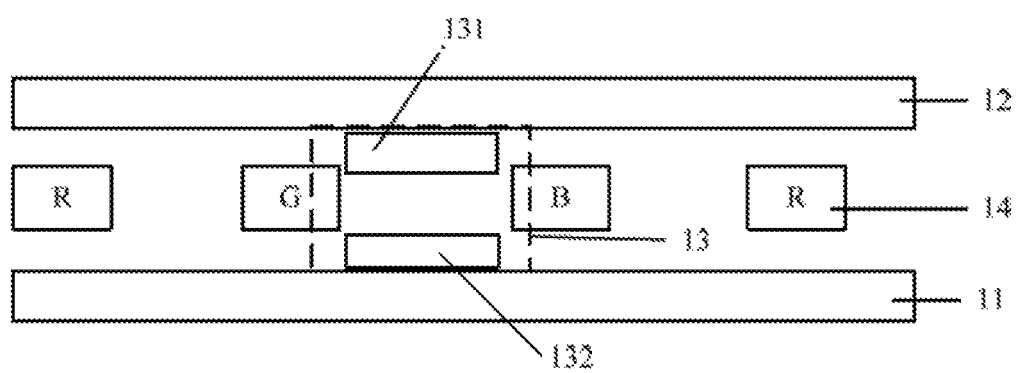
FIG. 2(b) is a schematic view of structure 2 of a touch panel according to an embodiment of the application.

Structure 2:

Referring to FIG. 2(b), the touch panel further includes: a display film layer 14 interposed between the substrate 11 and the touch film layer 12. The first module 131 is separated from the second module 132, and the first module 131 is arranged between the display film layer 14 and the touch film layer 12. The second module 132 is arranged at a side of the display film layer 14 adjacent to the substrate 11.

Optionally, the first module 131 is a fingerprint identification module which performs fingerprint identification in a fingerprint identification mode; and the second module 132 is a shooting module which performs image capturing in a shooting mode.

Specifically, in the fingerprint identification mode, the first module 131 collects fingerprint information and performs comparison and identification of the fingerprint information. In the shooting mode, the second module 132 collects and processes the scene image, and the specific processing operations may include an image beautification, a display, and the like.

Then, in the structure 2, the specific hardware structure of the image processing module may include: image sensing components arranged in an array and a fingerprint identification processor in the first module 131; image sensing components arranged in an array and an image processor in the second module 132. Alternatively, the specific hardware structure of the image processing module includes: an ultrasonic transmitter, a receiver, and a fingerprint identification processor located in the first module 131, image sensing components arranged in an array and an image processor in the second module 132.

The structure 2 integrates the fingerprint identification function and the image capturing function in one module in a separate manner, and an orthographic projection of the position occupied by the first module on the substrate coincides with an orthographic projection of the position occupied by the second module on the substrate. Thereby, a compact arrangement of structural components can be achieved; meanwhile, the structure of the in-display components can be simplified.

It should be noted that, in the above structures 1 and 2, the display film layer 14 is patterned, so that the image processing module 13 located below is not blocked; and meanwhile, the first module in the structure 2 can be also patterned in a similar design, such that an overlapping area of an orthographic projection of the pattern in the first module on the substrate 11 and an orthographic projection of the pattern in the display film layer 14 on the substrate 11 are minimized. Moreover, in the schematic view of the application, only the main film layer structure relationship is shown. In fact, at least one intermediate film layer may be arranged between the display film layer and the touch film layer, and between other adjacent film layers. For example, a thin film encapsulation layer or the like may be arranged between the display film layer and the touch film layer, which is not shown in the application.

Meanwhile, exemplary embodiments of the application also provide a display device, including the above touch panel. In addition, the display device can be any product or component with a display function, such as a mobile phone, a tablet computer, a television, a display, a notebook computer, a digital photo frame, a navigator, a smart wearable device, and the like. There may be other indispensable components of the display device which are understood by those skilled in the art, and are neither described herein, nor should they be construed as limitation to the application.

In view of the display device involved above, exemplary embodiments of the application also provide a method for performing fingerprint identification control using the above display device.

Figure 3:
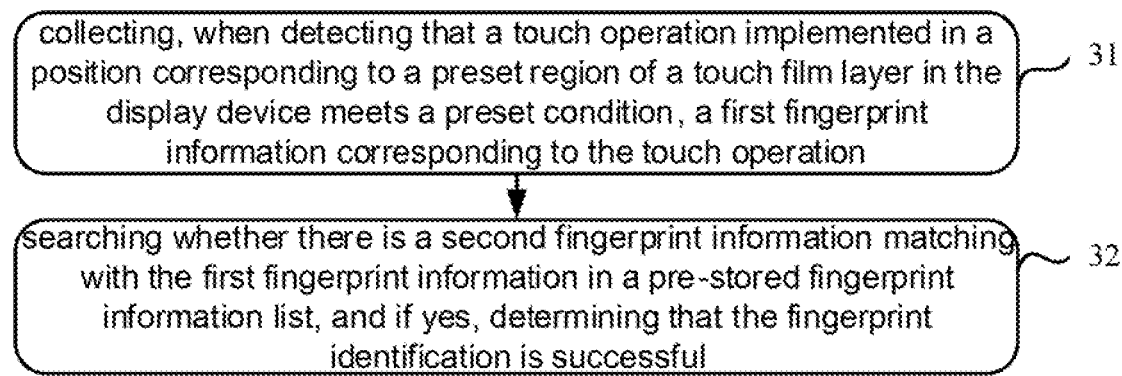
FIG. 3 is a schematic flowchart of a fingerprint identification control method according to an embodiment of the application.

Referring to FIG. 3, FIG. 3 is a schematic flowchart of a fingerprint identification control method according to an embodiment of the application, the method mainly includes:

Step 31: collecting, when detecting that a touch operation implemented in a position corresponding to a preset region of a touch film layer in the display device meets a preset condition, a first fingerprint information corresponding to the touch operation.

The preset region is provided with an image processing module for performing fingerprint identification and image shooting in a time share manner.

The display device herein can be understood as a finished display device product packaged with a display module, such as a mobile phone or a tablet computer. In fact, the mobile phone is always in the monitoring state of the preset region. When it is detected that the touch film layer in the preset region is touched and pressed, and the pressing extent meets a preset condition, the image processing module is triggered to be turned on, and the first fingerprint information at the pressed position in the touch film layer is collected.

Optionally, the preset condition includes at least one of the following: a pressing time implemented with the touch operation is greater than a first threshold; and a pressing force implemented with the touch operation is greater than a second threshold.

Optionally, in the application, collecting first fingerprint information corresponding to the touch operation may specifically include the following two execution modes:

Mode 1: a module for implementing the fingerprint identification function in the image processing module is an ultrasonic module.

Specifically, the image processing module in the preset region is triggered to be turned on, and the first fingerprint information is collected from the preset region in which the touch operation is performed using an ultrasonic fingerprint identification method.

This method does not focus on whether the display film layer is in a lighting up state, and the fingerprint information collection in the preset region can be realized as long as the ultrasonic transmitter and the receiver are provided.

Mode 2: a module for implementing the fingerprint identification function in the image processing module is an optical sensing module.

Specifically, the image processing module in the preset region is triggered to be turned on, and meanwhile the illuminating sub-pixel corresponding to the preset region is triggered to be lit up, thereby providing a light source for the optical sensing element, so as to collect and obtain from the preset region where the touch operation is implemented the first fingerprint information using an optical fingerprint identification manner.

In fact, the module for implementing the fingerprint identification function in the image processing module is not limited to the above two types, and may also be a capacitive fingerprint identification module or a pressure sensing type fingerprint identification module.

Step 32: searching whether there is a second fingerprint information matching with the first fingerprint information in a pre-stored fingerprint information list, and if yes, determining that the fingerprint identification is successful.

It should be noted that, in the application, the collected first fingerprint information includes a fingerprint of at least one finger. Correspondingly, the second fingerprint information also includes a fingerprint of at least one finger. The second fingerprint information may be fingerprint information pre-stored in the pre-stored fingerprint information list, and is generally collected and saved when the fingerprint is set. For example, the currently collected first fingerprint information is the fingerprint information collected when a left thumb and a right thumb of the user simultaneously press the preset region, and the fingerprint information at this time is the combination of the fingerprint information of the left thumb and the fingerprint information of the right thumb. When performing a search and comparison, it is determined that the fingerprint identification is successful only if the same combination of fingerprint information is found.

In fact, fingerprint identification can be used as unlocking verification, login verification or transaction verification and the like. The user experience can be enhanced by the integration of the fingerprint-on-display identification and the shooting function in the application.

Optionally, in the application, in addition to implementing fingerprint identification, the method further includes:

When receiving the shooting command, triggering the image processing module in the preset region to be turned on, and the image information in the current shooting scene is collected.

Specifically, when the first module and the second module of the image processing module are integrated together, the first module and the second module are triggered to be turned on, and the image information in the current shooting scene is collected using the first module. When the first module and the second module of the image processing module are separately arranged, only the second module used as a shooting module is triggered to be turned on, and the image information in the current shooting scene is collected using the second module.

And the illuminating sub-pixels of the display device corresponding to a region other than the preset region of the touch film layer is triggered to be lit up, and the image content corresponding to the image information collected by the image processing module is displayed.

In the application, the image processing module arranged in the preset region of the touch film layer is compatible with the fingerprint identification function and the image capturing function. Since the image processing module is arranged under the touch film layer and can be arranged in the display region where the touch film layer is located, it does not need to occupy the non-display region of the front surface of the touch panel, so that no additional frame is needed to accommodate fingerprint identification components and the camera components of the peripheral device, so that the full screen design of the touch panel can be effectively realized. Moreover, considering that the image processing module of the application has both fingerprint identification function and image capturing function, the defects of peripheral components occupying the display region can be reduced, and the effectiveness of the full screen design can be further improved. In addition, the fingerprint identification function and the image capturing function are integrated in the same region, which not only improves the compactness of the components, reduces the screen ratio, but also optimizes the manufacturing process.

The above are only exemplary embodiments of the application which are not intended to limit the application. For the person skilled in the art of the application, there can be various changes and modifications to the application. Any modification, equivalent replacement or substitutions made within the spirit and principle of the application, should be included in the protection scope of the application.

What is claimed is:

1. A touch panel comprising:
a substrate, and
a touch film layer arranged on a side of the substrate, an image processing module arranged on a position corresponding to a preset region of the touch film layer, and the image processing module comprising a first module and a second module performing fingerprint identification and image capturing in a time share manner, wherein the first module is an image collecting module collecting a fingerprint image in a fingerprint identification mode and a scene image in a shooting mode in a time share manner, and the second module is an image processing module processing the fingerprint image and the scene image in a time share manner.

2. The touch panel according to claim 1, wherein
the first module and the second module are integrated together, and are arranged at a side of the touch film layer adjacent to the substrate.

3. The touch panel according to claim 1, further comprising: a display film layer interposed between the substrate and the touch film layer.

4. The touch panel according to claim 3, wherein the first module is separated from the second module; and the first module is arranged between the display film layer and the touch film layer, and the second module is arranged at a side of the display film layer adjacent to the substrate.

5. The touch panel according to claim 4, wherein an orthographic projection of a position occupied by the first module on the substrate coincides with an orthographic projection of a position occupied by the second module on the substrate.

6. The touch panel according to claim 3, wherein the first module and the second module are integrated together, and are arranged at a side of the display film layer adjacent to the substrate.

7. The touch panel according to claim 1,
wherein the first module is a fingerprint identification module collecting fingerprint information and performing comparison and identification of the fingerprint information in a fingerprint identification mode; and the second module is a shooting module capturing scene images and processing the scene images in a shooting mode.

8. The touch panel according to claim 3, wherein the first module comprises: image sensing elements arranged in an array and a fingerprint identification processor in the first module, or, an ultrasonic transmitter, a receiver, and a fingerprint identification processor located in the first module.

9. A display device, comprising the touch panel according to claim 1.

10. A touch panel comprising:
a substrate, and
a touch film layer arranged on a side of the substrate, an image processing module arranged on a position corresponding to a preset region of the touch film layer, and the image processing module comprising a first module and a second module performing fingerprint identification and image capturing in a time share manner,
a display film layer interposed between the substrate and the touch film layer,
wherein the first module is separated from the second module; and the first module is arranged between the display film layer and the touch film layer, and the second module is arranged at a side of the display film layer adjacent to the substrate.

11. The touch panel according to claim 10, wherein an orthographic projection of a position occupied by the first module on the substrate coincides with an orthographic projection of a position occupied by the second module on the substrate.

12. A touch panel comprising:
a substrate, and
a touch film layer arranged on a side of the substrate, an image processing module arranged on a position corresponding to a preset region of the touch film layer, and the image processing module comprising a first module and a second module performing fingerprint identification and image capturing in a time share manner,
wherein the first module is a fingerprint identification module collecting fingerprint information and performing comparison and identification of the fingerprint information in a fingerprint identification mode; and the second module is a shooting module capturing scene images and processing the scene images in a shooting mode.

* * * * *